Oct. 30, 1956      S. B. DUNHAM      2,769,098
WIDE RANGE RADIATION INSTRUMENT
Filed April 21, 1953
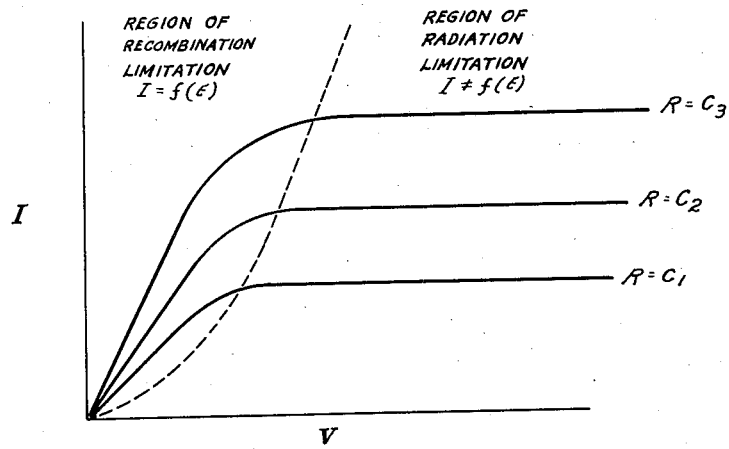
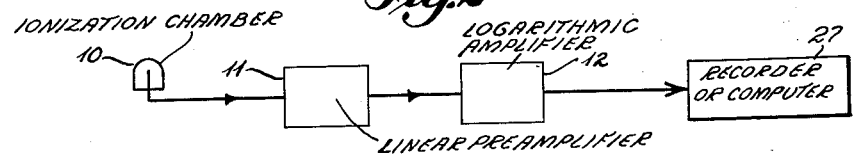
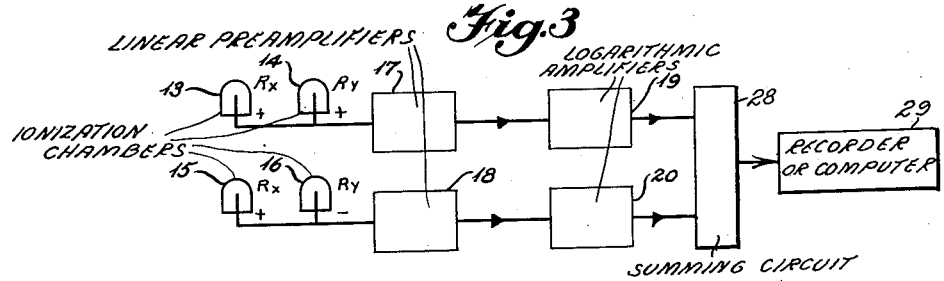
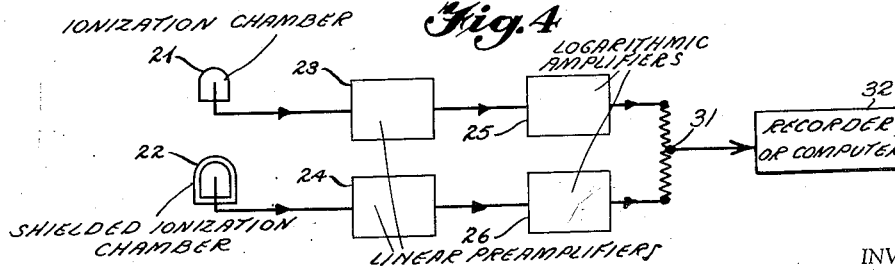
INVENTOR
Stuart B. Dunham
BY
ATTORNEYS

United States Patent Office 2,769,098
Patented Oct. 30, 1956

2,769,098

WIDE RANGE RADIATION INSTRUMENT

Stuart B. Dunham, Schenectady, N. Y., assignor, by mesne assignments, to the United States of America as represented by the Secretary of the Navy Application April 21, 1953, Serial No. 350,013

3 Claims. (Cl. 250—83.6)

This invention relates to a system of measuring radiations whereby a greater range can be obtained from a single meter or computer without scale changes than has been heretofore possible. The range of the ordinary linear amplifier is limited by saturation at the high end and by noise background at the low end. By utilizing the method involved in the instant invention, the amplifier may be within the limits noted above be operated over a greater range of equivalent input signals without scale changes.

In the operation of an ionization chamber below the level where gas amplification takes place, there are two regions of operation. One is the level where current is primarily limited by recombination and the other is where it is primarily limited by the intensity of the radiation. Heretofore, ionization chambers were normally operated in the region of radiation limitation.

The advantages of the instant invention exist when the ionization current varies as a power less than unity. As long as this is true, the ionization current output will vary less rapidly than the input level of radiation. The more the power law deviates from unity, the more the range of linear amplifier operation will be reduced when using a chamber operating in the recombination region rather than in the linear radiation region. Thus, the advantages of either a compressed scale or of operation through a linear amplifier over a wider range of inputs would be possible.

Theoretically, for a parallel plane ionization chamber, it appears that the ionization current in the recombination region will vary as the square root of the radiation intensity. In the instant invention, a parallel plane ionization chamber is operated in the recombination region. The resultant ionization current output which varies as the ½ power of the radiation intensity is applied to a logarithmic amplifier. Thus, the logarithm of the ionization current rather than the current itself is measured, with a resultant compression of the scale of the meter. This is especially useful when low values are to be read or in computer applications where multiplication or division must be performed.

Accordingly it is an object of this invention to provide a means for operating a radiation meter over a greater range than has heretofore been possible.

Another object of this invention is to provide a means whereby the logarithm of radiations may be measured.

A further object of this invention is to increase the range of equivalent inputs possible within the physical limits of a linear amplifier.

For a better understanding of these and other objects of this invention, reference is made to the following specifications and accompanying drawings wherein:

Fig. 1 represents a graph illustrating the characteristics of the regions of recombination and radiation limitation.

Fig. 2 is a schematic representation illustrating a means whereby the logarithm of radiation intensity may be determined.

Fig. 3 is a schematic representation illustrating a means whereby the logarithm of the difference in radiation intensity in two chambers may be determined; and Fig. 4 is a schematic representation illustrating the employment of the instant invention in a radiation attenuation comparator.

Referring to Fig. 1, in the region of radiation limitation, the ionization chamber is exposed to radiations. The rate at which ionization takes place within the chamber is determined by the intensity of the radiation. The voltage between the electrodes determines the rate at which the ions travel across the chamber to one electrode or the other, but do not in any way effect the rate of ionization. But in all events, the magnitude of the voltage is such that the ions are propelled to the electrodes before they can recombine into neutral molecules. It can therefore be seen that the magnitude of the ionization current is determined solely by the intensity of the radiation and is not in any way effected by the magnitude of the voltage across the electrodes. Accordingly in the graph of Fig. 1 the ionization current in the region of radiation limitation is a constant for all values of voltage, the radiation intensity being the parameter.

In the region of recombination limitation, the rate of ionization is again determined by the intensity of radiation. However, the magnitude of the applied voltage is such that recombination of the ions into neutral molecules commences before the ions reach the electrodes. The extent to which recombination takes place is determined by the rate at which the molecules are propelled toward the electrodes, the rate of propulsion being dependent upon the applied voltage. It may therefore be seen that for a constant level of radiation intensity, the ionization current will vary with the applied voltage in the region of radiation-limitation.

In general, the ionization current will vary as a power of the radiation, i. e. $I_c = CR^k$. If this current from ionization chamber 10 is fed into a linear preamplifier 11 containing a high value resistance, the current is transformed into a voltage. It is desirable to employ a feedback amplifier in order to prevent the ionization current from being affected by the voltage drop. A logarithmic amplifier 12 is contained in the circuit to extract the log of the voltage, or $E_0 = \log C + k \log R$. It is thus seen that the output of the circuit is a constant plus a term proportional to the logarithm of the radiation intensity. The output in logarithmic form is of advantage in several cases, such as in computer application when multiplication or division is to be performed, or to permit the determination of low values with high accuracy. The output voltage of logarithmic amplifier 12 may be applied to a recorder or a computer 27, if desired.

This method can also be employed when it is desired to find a differential. In this case, a circuit such as that disclosed in Fig. 3 is employed. Assume ionization chambers are being employed wherein the ½ power law is followed. Ionization chambers 14 and 16 are exposed to a radiation intensity Y whereas chambers 13 and 15 are exposed to a radiation intensity X. Chambers 13 and 14 are connected so that their currents add, while chambers 15 and 16 are connected so that their currents oppose. The voltage aplied to the chamber is such that operation is in the region of recombination limitation. The output from chambers 13 and 14 and 15 and 16 are aplied to linear preamplifiers 17 and 18 and logarithmic amplifiers 19 and 20 respectively in a manner similar to that noted above. The outputs of logarithmic amplifiers 19, 20, are applied to a summing circuit 28. For purposes of nomenclature, the output of chambers 13 and 15 which are exposed to radiation of intensity X will be designated $R_x$ while the output of chambers 14 and 16 which are exposed to a radiation of intensity Y will be designated $R_y$. Accordingly, the output of logarithmic amplifier 19 will be:

$$E = \log K + \log (R_x^{1/2} + R_y^{1/2})$$

since chambers 13 and 14 are connected so that their outputs add.

Similarly, the output of logarithmic amplifier 20 will be:

$$E' = \log K' + \log (R_x^{1/2} - R_y^{1/2})$$

since chambers 15 and 16 are connected so that their chambers oppose.

If the outputs of logarithmic amplifiers 19 and 20 are combined by summing circuit 28, the result is:

$$E_t = \log KK' + \log (R_x^{1/2} + R_y^{1/2})(R_x^{1/2} - R_y^{1/2})$$

or upon simplification, $$E_t = \log KK' + \log (R_x - R_y)$$

which is the differential desired. The output of summing circuit 28 may be applied to a recorder or computer 29, if desired.

The system disclosed by the present invention may also be employed in a radiation attenuation comparator. In Fig. 4, unshielded chamber 21 and shielded chamber 22 are both exposed to a radiation of intensity R. Accordingly, the current output from the unshielded chamber will be:

$$I_u = AR^p$$

where A is a proportionality constant, and $p$ is the power exponent law. For the shielded chamber, the current will be:

$$I_s = AR^{p\epsilon - pt/\lambda}$$

where $t$ is the thickness of the shield, and $\lambda$ is the mean free path, i. e. the average distance the ions travel between collisions.

The output of the linear preamplifiers 23 and 24 will be voltages proportional to the input currents, or $$E_u = BR^p$$

and $$E_s = BR^{p\epsilon - pt/\lambda}$$

When $E_u$ and $E_s$ are applied to logarithmic amplifiers 25 and 26, their outputs respectively are:

$$E_{Lu} = c + p \log R$$

and $$E_{Ls} = c + p \log R^{\epsilon - pt/\lambda}$$

If logarithmic amplifiers 25 and 26 are connected, for example, across an impedance 31, so that their outputs oppose, the output of the circuit will be:

$$E_d = E_{Lu} - E_{Ls} = pt/\lambda$$

The differential outputs of logarithmic amplifiers 25, 26 appearing across impedance 31 may be applied to a recorder or computer 32, if desired.

The function $t/\lambda$ is what is desired in the radiation attenuation comparator. It can be seen that this can be obtained regardless of any non-negative value of the power law $p$, for the variation of ionization current with radiation as long as the power law is known. As long as the power law is less than unity, the device will work over a wider range of input radiation than a device employing a chamber operating in the region of radiation limitation.

What I claim as my invention is:

1. A wide range radiation measuring instrument comprising: an ionization chamber means, means for subjecting said ionization chamber means to the radiation to be measured and means for applying to said ionization chamber means a voltage characteristic of the region of recombination limitation of said ionization chamber means whereby ionization currents will be produced by said ionization chamber means that vary as a function of received radiation intensity and the magnitude of the applied voltage, linear preamplifier means connected to said ionization chamber means to provide an output voltage linearly related to the magnitude of said ionization currents, logarithmic amplifier means coupled to the output of said linear preamplifier means to provide an output voltage logarithmically related to the magnitude of said ionization currents, and an output circuit means coupled to the output of said logarithmic amplifier.

2. The combination of claim 1 wherein said ionization chamber means comprises first, second, third and fourth ionization chambers with said first and third chambers being subjected to a radiation of one intensity and said second and fourth chambers being subjected to radiation of another intensity, said first and second chambers being additively connected so that the sum of the ionization currents therefrom is obtained, said third and fourth chambers being subtractively connected so that the difference of the ionization currents therefrom is obtained; wherein said linear preamplifier means comprises a first linear preamplifier connected to said first and second chambers, and a second linear preamplifier connected to said third and fourth chambers; and wherein said logarithmic amplifier means comprises a first logarithmic amplifier connected to said first preamplifier and a second logarithmic amplifier connected to said second preamplifier; and wherein said output circuit means comprises a summing circuit means having output terminal means whereby a voltage is produced at said output terminal means which varies as the logarithm of the difference between said radiation intensities.

3. The combination of claim 1 wherein said ionization chamber means comprises an unshielded ionization chamber and a shielded ionization chamber; wherein said linear preamplifier means comprises a first linear preamplifier connected to said unshielded chamber and a second linear preamplifier connected to said shielded chamber; and wherein said logarithmic amplifier means comprises a first logarithmic amplifier connected to said first preamplifier and a second logarithmic amplifier connected to said second preamplifier; and wherein said output circuit means comprises means to differentially combine the outputs from said first and second logarithmic amplifiers and include output terminal means whereby a voltage is produced at said output terminal means which varies directly as the thickness of the shielding of said shielded ionization chamber and which varies inversely as the mean free path of the radiation.

References Cited in the file of this patent

UNITED STATES PATENTS

| | | |
|---|---|---|
| 2,457,747 | Sweet | Dec. 28, 1948 |
| 2,478,163 | Sweet | Aug. 2, 1949 |
| 2,561,243 | Sweet | July 17, 1951 |
| 2,598,215 | Borkowski et al. | May 27, 1952 |

OTHER REFERENCES

Design and Application of a Logarithmic Amplifier, by C. W. Johnstone, U. S. Atomic Energy Commission AECU-363 (LADC 668).